United States Patent
Merry et al.

(10) Patent No.: US 8,108,692 B1
(45) Date of Patent: Jan. 31, 2012

(54) SOLID-STATE STORAGE SUBSYSTEM SECURITY SOLUTION

(75) Inventors: David E. Merry, Irvine, CA (US); Mark Diggs, Laguna Hills, CA (US); Gary A. Drossel, Laguna Niguel, CA (US); Michael J. Hajeck, San Juan Capistrano, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 1326 days.

(21) Appl. No.: 11/475,841

(22) Filed: Jun. 27, 2006

(51) Int. Cl.
*G06F 12/14* (2006.01)
(52) U.S. Cl. .................... 713/193; 711/100
(58) Field of Classification Search .............. 711/100; 713/168–169, 193
See application file for complete search history.

(56) References Cited

U.S. PATENT DOCUMENTS

| | | | | |
|---|---|---|---|---|
| 5,058,162 | A * | 10/1991 | Santon et al. | 705/51 |
| 5,293,610 | A * | 3/1994 | Schwarz | 711/164 |
| 5,530,960 | A * | 6/1996 | Parks et al. | 710/5 |
| 5,805,800 | A * | 9/1998 | Kotani et al. | 726/27 |
| 6,006,190 | A * | 12/1999 | Baena-Arnaiz et al. | 705/56 |
| 6,321,314 | B1 * | 11/2001 | Van Dyke | 711/163 |
| 6,633,963 | B1 * | 10/2003 | Ellison et al. | 711/163 |
| 6,735,650 | B1 * | 5/2004 | Rothberg | 710/74 |
| 6,738,904 | B2 * | 5/2004 | Linnartz et al. | 713/189 |
| 6,823,398 | B1 * | 11/2004 | Lee et al. | 710/5 |
| 6,845,387 | B1 | 1/2005 | Prestas et al. | |
| 6,968,459 | B1 * | 11/2005 | Morgan et al. | 713/189 |
| 7,093,139 | B2 * | 8/2006 | Silverbrook et al. | 713/194 |
| 7,149,854 | B2 * | 12/2006 | Weber et al. | 711/152 |
| 7,215,771 | B1 * | 5/2007 | Hamlin | 380/44 |
| 7,376,898 | B1 * | 5/2008 | Yehuda et al. | 715/741 |
| 7,469,345 | B2 * | 12/2008 | Shimada et al. | 713/193 |
| 7,607,177 | B2 * | 10/2009 | Estakhri et al. | 726/27 |
| 7,765,373 | B1 * | 7/2010 | Merry et al. | 711/163 |
| 7,912,991 | B1 * | 3/2011 | Merry et al. | 710/8 |
| 7,971,071 | B2 * | 6/2011 | Walkoe et al. | 713/193 |

(Continued)

FOREIGN PATENT DOCUMENTS

EP 387599 A2 9/1990

(Continued)

OTHER PUBLICATIONS

Office Action dated Aug. 20, 2008 received in related U.S. Appl. No. 11/475,386 in 13 pages.

(Continued)

*Primary Examiner* — Jason M Repko
*Assistant Examiner* — Gandhi Thirugnanam
(74) *Attorney, Agent, or Firm* — Knobbe Martens Olson & Bear LLP

(57) ABSTRACT

A solid-state storage subsystem, such as a non-volatile memory card or drive, includes a main memory area that is accessible via standard memory access commands (such as ATA commands), and a restricted memory area that is accessible only via one or more non-standard commands. The restricted memory area stores information used to control access to, and/or use of, information stored in the main memory area. As one example, the restricted area may store one or more identifiers, such as a unique subsystem identifier, needed to decrypt an executable or data file stored in the main memory area. A host software component is configured to retrieve the information from the subsystem's restricted memory area, and to use the information to control access to and/or use of the information in the main memory area.

12 Claims, 5 Drawing Sheets

U.S. PATENT DOCUMENTS

| | | | |
|---|---|---|---|
| 2002/0107802 A1* | 8/2002 | Philips | 705/51 |
| 2002/0141583 A1* | 10/2002 | Barnard et al. | 380/202 |
| 2002/0152377 A1* | 10/2002 | Bauman et al. | 713/168 |
| 2002/0166064 A1* | 11/2002 | Harrison | 713/200 |
| 2003/0126455 A1* | 7/2003 | Sako et al. | 713/193 |
| 2003/0145183 A1* | 7/2003 | Muehring | 711/163 |
| 2004/0117309 A1* | 6/2004 | Inoue et al. | 705/50 |
| 2004/0236918 A1* | 11/2004 | Okaue et al. | 711/164 |
| 2005/0005149 A1* | 1/2005 | Hirota et al. | 713/193 |
| 2005/0071656 A1* | 3/2005 | Klein et al. | 713/193 |
| 2005/0091509 A1* | 4/2005 | Herberth | 713/182 |
| 2005/0185067 A1* | 8/2005 | Estakhri et al. | 348/231.9 |
| 2005/0240738 A1* | 10/2005 | Shirogane et al. | 711/152 |
| 2006/0031687 A1* | 2/2006 | Su et al. | 713/193 |
| 2006/0041934 A1* | 2/2006 | Hetzler | 726/9 |
| 2006/0080526 A1* | 4/2006 | Kasahara et al. | 713/155 |
| 2006/0174055 A1 | 8/2006 | Flynn | |
| 2007/0038827 A1 | 2/2007 | Inooka et al. | |
| 2007/0067647 A1* | 3/2007 | Klein | 713/193 |
| 2007/0172053 A1* | 7/2007 | Poirier | 380/28 |
| 2007/0223705 A1 | 9/2007 | Kasahara et al. | |
| 2008/0320314 A1* | 12/2008 | Eckleder et al. | 713/189 |

FOREIGN PATENT DOCUMENTS

| | | |
|---|---|---|
| EP | 1164588 A2 * | 12/2001 |
| EP | 1587095 A2 * | 10/2005 |
| GB | 2374718 A * | 10/2002 |

OTHER PUBLICATIONS

Office Action dated Oct. 2, 2009 received in related U.S. Appl. No. 11/475,386 in 15 pages.

Office Action dated Apr. 4, 2008 received in related U.S. Appl. No. 11/475,386 in 11 pages.

Office Action dated Feb. 5, 2009 received in related U.S. Appl. No. 11/475,386 in 14 pages.

Notice of Allowance dated Mar. 19, 2010 received in related U.S. Appl. No. 11/475,386 in 14 pages.

* cited by examiner

FIG. 4

| Byte Numbers | Data |
|---|---|
| 0 to 31 | 00h |
| 32 to 37 | String 1 |
| 38 to 63 | 00h |
| 64 to 69 | String 2 |
| 70 to 511 | 00h |

| Register | D7 | D6 | D5 | D4 | D3 | D2 | D1 | D0 |
|---|---|---|---|---|---|---|---|---|
| Feature | | | | X | | | | |
| Sector Count | | | | 01h | | | | |
| Sector Number | | | | X | | | | |
| Cylinder Low | | | | X | | | | |
| Cylinder High | | | | X | | | | |
| Drive Head | 1 | X | 1 | Drive | | | X | |
| Command | | | | 86h | | | | |

500

501

SOLID-STATE STORAGE SUBSYSTEM SECURITY SOLUTION

BACKGROUND

1. Field of the Invention

The present invention relates to solid-state storage subsystems. More specifically, the present invention relates to restricting access to, and controlling the use of, software and data stored by a solid-state storage subsystem.

2. Description of the Related Art

Solid-state storage subsystems are used to store a wide variety of software and information. For example, a solid-state memory subsystem such as an advanced technology attachment ("ATA") flash disk or a removable flash memory card may store information susceptible to theft, including, for example, executable code, trade secrets, financial data, security information, military information, credit card information, or other information that a user or vendor desires to keep restricted.

Conventional approaches to reducing unauthorized access to software stored on a solid-state memory subsystem typically rely on restricting access to certain individuals. Conventional systems often use identification information, such as a login and a password or a fingerprint, to grant access to software stored on the memory subsystem. One problem with such an approach is that an authorized user of the solid-state memory subsystem can use the software in an unauthorized way. For example, a user who has access to a memory subsystem with software may only have authorization to install that software on one client system, but, because he has access to the subsystem, may install the software on multiple, unauthorized client systems. Furthermore, an unauthorized user may be able to obtain the authorized user's access codes and thus gain access to the memory subsystem. A skilled user may also be able to remove the authorization requirement, or "crack" the access code, and gain access to the subsystem.

SUMMARY

Thus, it would be advantageous to develop system and method for restricting access to solid-state storage subsystems that is not dependent, or solely dependent, upon the identity or access credentials of the user.

One embodiment of the invention is a solid-state storage subsystem, such as a non-volatile memory card or drive, that includes a main memory area that is accessible via standard memory access commands (such as ATA commands), and a restricted memory area that is accessible only via one or more non-standard commands. Other embodiments may include other storage subsystems, such as hard disk drives or hybrid hard drives, that contain a restricted memory area accessible via one or more non-standard commands. The restricted memory area stores information used to control access to, and/or use of, information stored in the main memory area. As one example, the restricted area may store one or more identifiers, such as a unique subsystem identifier, needed to decrypt an executable or data file stored in the main memory area. As another example, the restricted area may store an identifier, such as a subsystem or subsystem type identifier, that is verified by a host computing device before read access is granted to the main memory area.

A host software component that runs on the host computing device is configured to retrieve the information from the subsystem's restricted memory area using one or more non-standard commands, and to use this information to control access to and/or use of the information in the main memory area. For example, the host component may use this information to decrypt a file stored in the storage subsystem's main memory, and/or may verify the retrieved information before granting access to the subsystem's main memory area. The host component (and thus the host computing device) may be specially configured to work only with a storage subsystem containing a particular unique subsystem identifier, or a particular subsystem-type identifier, in its restricted area.

In some embodiments, the host component may also be configured to identify the host to the storage subsystem. The storage subsystem may in turn compare the host's identifier to an expected value before granting access to the subsystem's main memory. By allowing both systems to identify one another, a one-to-one pairing may be created between the two systems such that either of the systems may only be used with the other.

Neither this summary nor the following detailed description purports to define the invention. The invention is defined by the claims.

BRIEF DESCRIPTION OF THE DRAWINGS

Systems and methods which embody the various features of the invention will now be described with reference to the following drawings, in which:

FIG. 4 illustrates an exemplary data register containing access identification strings according to an embodiment of the invention; and FIG. 5 illustrates an exemplary data structure for a read key command according to an embodiment of the invention.

DETAILED DESCRIPTION OF SPECIFIC EMBODIMENTS

Figure 1:
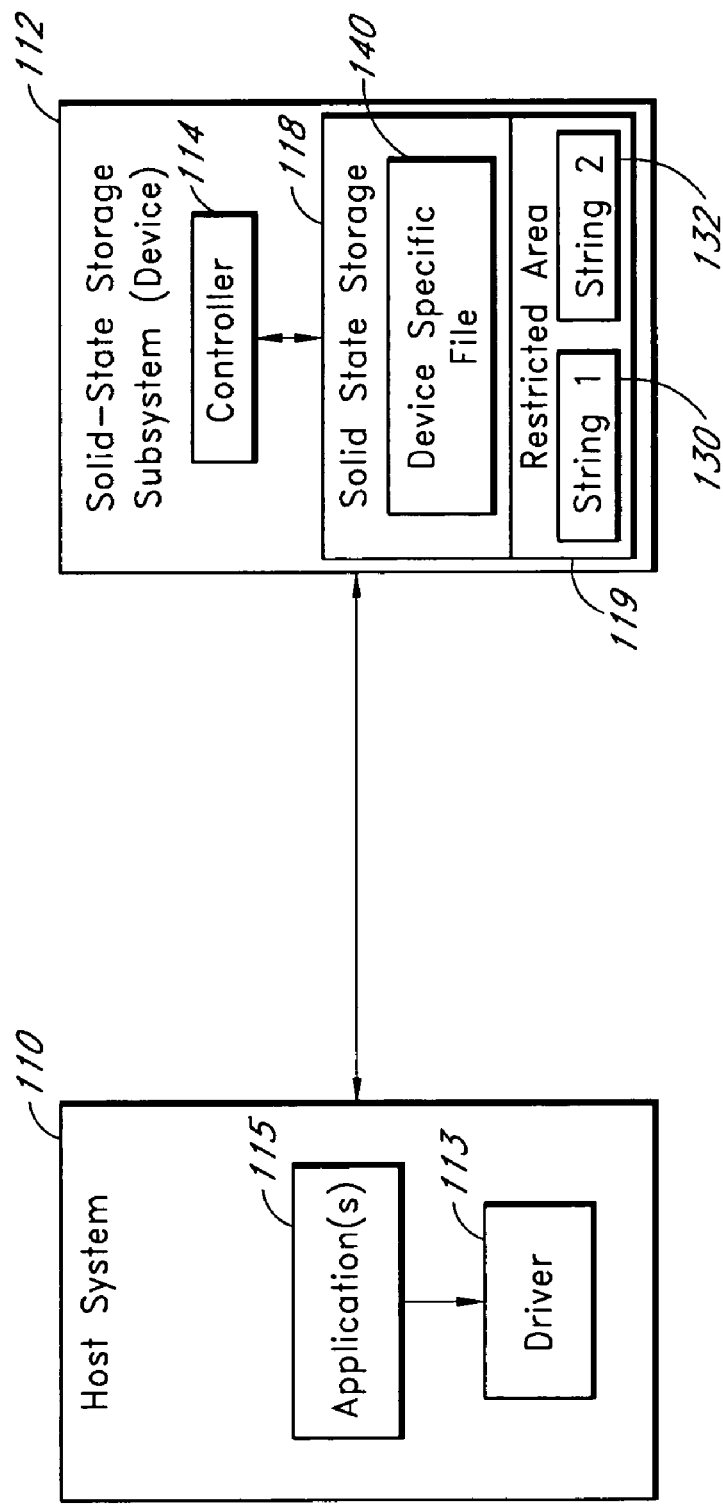
FIG. 1 is a block diagram illustrating a host system linked to a solid-state storage subsystem according to an embodiment of the invention.

In the following description, reference is made to the accompanying drawings which show, by way of illustration, specific embodiments and applications of the invention. Where possible, the same reference numbers are used throughout the drawings to refer to the same or like components. In some instances, numerous specific details are set forth in order to provide a thorough understanding of the present disclosure. The present invention, however, may be practiced without the specific details or with certain alternative equivalent components and methods to those described herein. In other instances, well-known components and methods have not been described in detail so as not to unnecessarily obscure aspects of the present disclosure.

In one embodiment of the invention, a solid-state storage subsystem, which may be in the form of a detachable device, includes a restricted memory area that is accessible only via non-standard commands, such as vendor-specific commands supported by the ATA interface standard. The restricted memory area preferably stores a unique identifier of the solid-state storage subsystem, and/or stores information that identifies its brand or type. Some or all of this information may be written to the restricted memory area during the manufacture or initialization of the subsystem, and may be stored in read-only form. A host computer system uses this information to implement an access control policy for controlling access to other information stored in the subsystem, such as data and/or executable code stored in a main or "user data" memory area. The access control policy may be implemented in-whole or in-part via special driver software executed by the host.

Various types of access control policies may be implemented using the information stored in the restricted area. For example, the host system may ensure that it is communicating with a certain unique solid-state storage subsystem, or a certain brand or type of solid-state storage subsystem, before granting access to the main or "user data" memory area of the subsystem. The access control policy may, in some embodiments, involve the generation of encryption/decryption keys for accessing subsystem's user data area.

As one example, a vendor of software may initially send a kit including a handheld computing system and a solid-state storage subsystem containing a unique identification string. The handheld system may be configured to run executable software only from a solid-state storage subsystem that contains the unique string. If the vendor releases a new version of the executable software, the vendor may send another solid-state storage subsystem with the updated software and the same identification string to the customer. The customer may then replace the old solid-state storage subsystem connected to the handheld system with the new one. Furthermore, the software may be stored in the subsystem in an encrypted form, so that it cannot be executed by other host systems.

The host system may, in some embodiments, also be configured (e.g., via the driver software) to identify itself to the solid-state storage subsystem. The solid-state storage subsystem may thus identify the host system, and the host system may likewise identify the solid-state storage subsystem using the string. By allowing both systems to identify each other, a one-to-one pairing may be created between the two systems such that each system may only be used with the other.

FIG. 1 is a diagram illustrating one embodiment of the invention. A host computer system 110, which may, for example, be a Personal Computer or a Personal Digital Assistant, is connected to a solid-state storage subsystem 112 (hereinafter "subsystem 112" or "storage subsystem 112"). The subsystem 112 may, for example, be in the form of a solid-state memory card or drive that plugs into a PCMCIA, USB, Firewire, or other slot or port of the host system 110. In this particular embodiment, the restricted, non-volatile memory area 119 of the subsystem stores two strings 130, 132, one of which identifies a type or brand of the subsystem, and the other which contains a unique identifier of the subsystem 112. Other numbers of strings, and/or other types of information, may additionally or alternatively be stored in the restricted area 119. As one example, the string or strings may contain an identifier of a type of application program stored on the subsystem 112.

The restricted memory area 119, and thus the strings 130, 132, are preferably accessible only via one or more vendor-specific commands, and thus are not exposed to the host's operating system. Stated differently, the standard memory access command codes used to access the subsystem's "user data" memory area do not provide access to the restricted area 119. In one embodiment, the strings are stored in a restricted 512-byte block of the subsystem's non-volatile memory array; however, the strings may be stored in any type of non-volatile storage, including register storage that is separate from the subsystem's non-volatile memory array.

The subsystem 112 is also shown with a device-specific file 140 stored in its main memory area. This file may contain executable code, data or both, and may but need not be encrypted. If the file 140 is encrypted, the encryption method is preferably based partly or wholly on the one or both of the strings 130, 132, stored in the restricted area 119. As one example, the file may be an executable file that is distributed via the subsystem 112, and that is encrypted based on the subsystem's unique identifier. Although a single file 140 is shown, any number of such files may be stored on the subsystem.

The host system 110 executes software, such as a driver 113, that is configured to use the vendor-specific command or commands to retrieve a block of data from the restricted area 119, and to extract the strings 130, 132 therefrom. The driver/host may use one or both strings to determine whether to enable one or more host applications 115 to access the subsystem 112. The host/driver may also use one or both strings as, or to generate, encryption/decryption keys for accessing the subsystem 112. The driver 113 may communicate with, or be part of, one or more software applications 115 that are specifically configured to use the storage subsystem 112. The driver 113 may also execute one or more software applications 115 executed directly from the storage subsystem 112. The driver 113 preferably includes functionality for using information read from the subsystem's restricted memory area 119 to control access or use of the device-specific file. For instance, the driver 113 may be configured to decrypt the file 140 using information read from the restricted area 119.

As another form of access control, the driver 113 may additionally or alternatively be configured to compare a value read from the restricted area 119 to an expected value. This expected value may be partially or wholly hard coded in the driver 113 in an obfuscated form, and/or may consist of or include a user-entered password entered via the host system each time the subsystem is used. The driver 113 may grant subsequent access to the subsystem 112 only if a match occurs.

A vendor of software on the host system 110 may decide to restrict access to software stored on the solid-state storage subsystem 112. For example, the vendor may want to restrict unauthorized access to the software when there is a significant likelihood that software on the subsystem 112 may not be used with the appropriate host system 110 or type of host system.

Figure 2A:
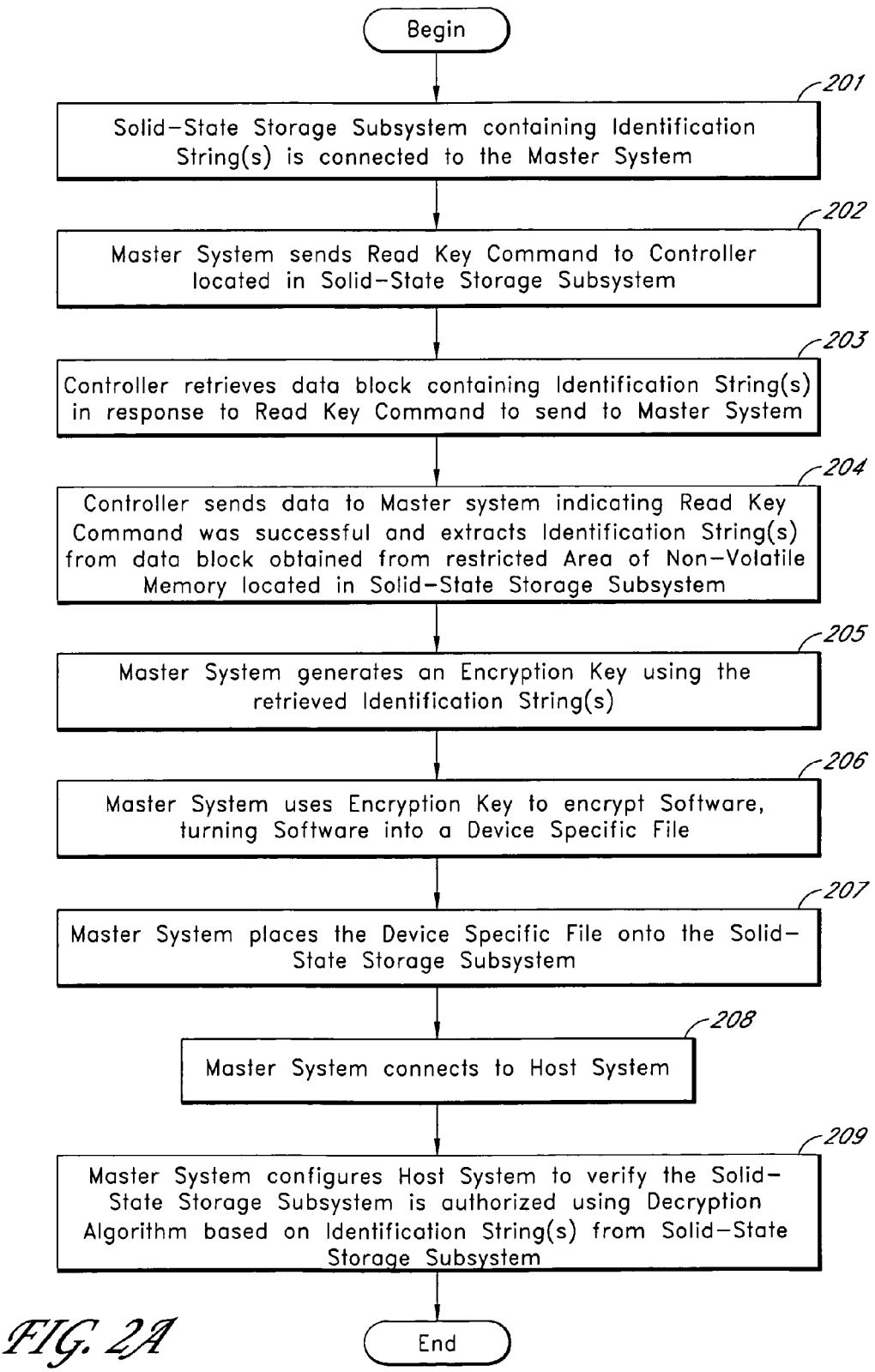
FIGS. 2A and 2B illustrate a sample process for pairing a storage subsystem with a host system using a master system
Figure 2B:
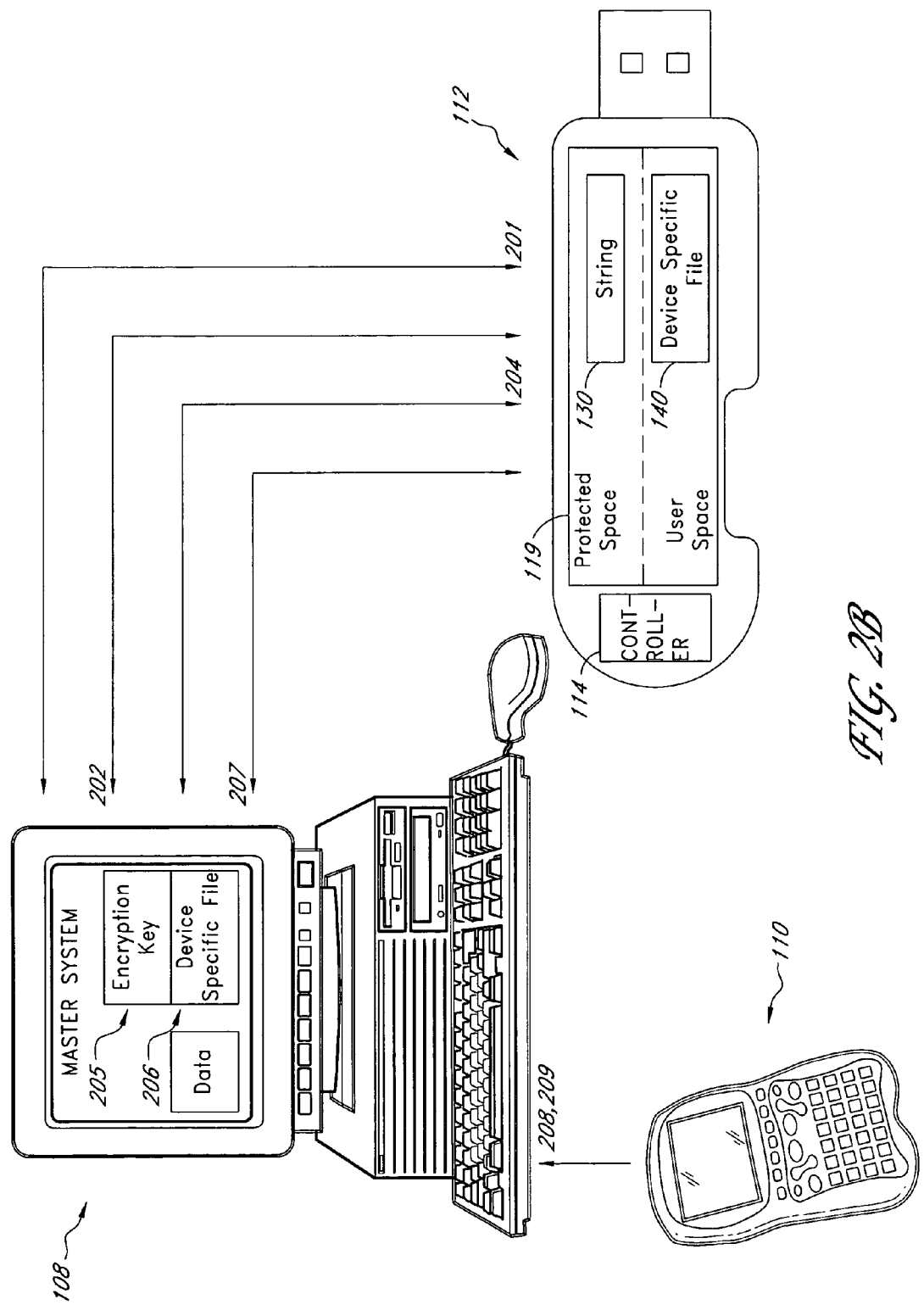

FIGS. 2A and 2B illustrate a sample process for pairing a storage subsystem 112 as described above with a host system 110 using a master system 108. The master system 108 may be controlled by a software vendor desiring software protection capabilities. Once the pairing has been created, the vendor may send the host system 110 and the subsystem 112 to a customer. The flow diagram shown in FIG. 2A is applicable both to the two-string embodiment shown in FIG. 1, and to embodiments that use other numbers of strings.

First, in step 201, a subsystem 112 (solid-state storage subsystem) containing one or more strings as described above is connected to the master system 108. Next, in step 202 the master system 108 sends a vendor specific "read key" command (500 in FIG. 5) to the subsystem 112. In response, in step 203 the subsystem's controller 114 retrieves the block of data containing the identification string(s). The controller 114 then extracts the identification string(s) from the data block and sends a command in step 204 to the master system 108 indicating the read key command 500 was successful. Next, the master system 108 optionally generates an encryption key in step 205 using the retrieved string(s). The encryption key may be generated by encrypting the string(s), optionally together with other information such as a pass-code, password, or a serial number, using any appropriate encryption algorithm(s). In other embodiments, other unique identifiers may be used. Example encryption methods include symmetric key algorithms such as DES, IDEA, AES, RC2, RC4, Skipjack, cryptographic hash functions, and polyalphabetic substitution ciphers. The encryption method may alternatively be selected by a vendor that will be using the subsystem 112 to protect software. In yet further embodiments, the string or strings themselves may be used as or as part of the encryption key, without first being encrypted. The additional level of protection offered by the password may be established by any well known method in the art. Furthermore, the password data may be stored in the restricted memory area 119 on the subsystem 112.

In step 206, the master system 108 uses the encryption key generated from the string(s) 130, 132 to encrypt the software. Assuming the string(s) uniquely identify the subsystem 112, this step converts the software into a device specific file 140, since the software may only be decrypted using the string data stored on the subsystem 112. After encrypting the software, the master system 108 writes the device, specific file 140 onto the subsystem 112 in step 207. The master system 108 may also copy the encryption key to the same protected area where the string data is stored, although this step may be omitted since the encryption key may be recreated using the string data and an optional pass-code. For example, the pass-code may be combined with the string data using any well known method to create an encryption key for the drive specific file 140. In certain embodiments, a pass-code may be generated when the drive specific file 140 is written onto the subsystem 112. In certain embodiments, the pass-code may be stored in the restricted area, while in other embodiments the pass-code may be stored in the general area in an encrypted format. The master system 108 may then connect to a host system 110 meant to accompany the subsystem 112 in step 208 in order to configure the host system 110 for use with the subsystem 112. As part of this process, the host system may, for example, be provided with a host-specific driver 113 that is configured to verify a portion of the string data read from the restricted memory area 119. The host-specific driver may also be encoded with unique information for generating the key from the retrieved string data.

In other embodiments, in order to ensure that a subsystem 112 only grants access to a unique host system 110, the host system 110 could "identify" itself to the subsystem 112 when the host system starts up. Furthermore, the host system can also send a unique identifier to the subsystem 112, which the subsystem 112 will then always look for when the host system 110 starts up whenever the host system 110 attempts to access the subsystem 112. In yet further embodiments, the unique identifier may be generated by the host system 110 at specified and/or random times, such as every N days or every Y days where Y is a value associated with a number of writes. The identifier may be stored in the restricted area and in addition to the two strings 130 and 132 may be used as a third piece of data required to grant access to the subsystem 112. In yet other embodiments, the generated identifier could replace the use of the two strings. In yet further embodiments, the generated identifier may be written in the unrestricted data area.

Figure 3:
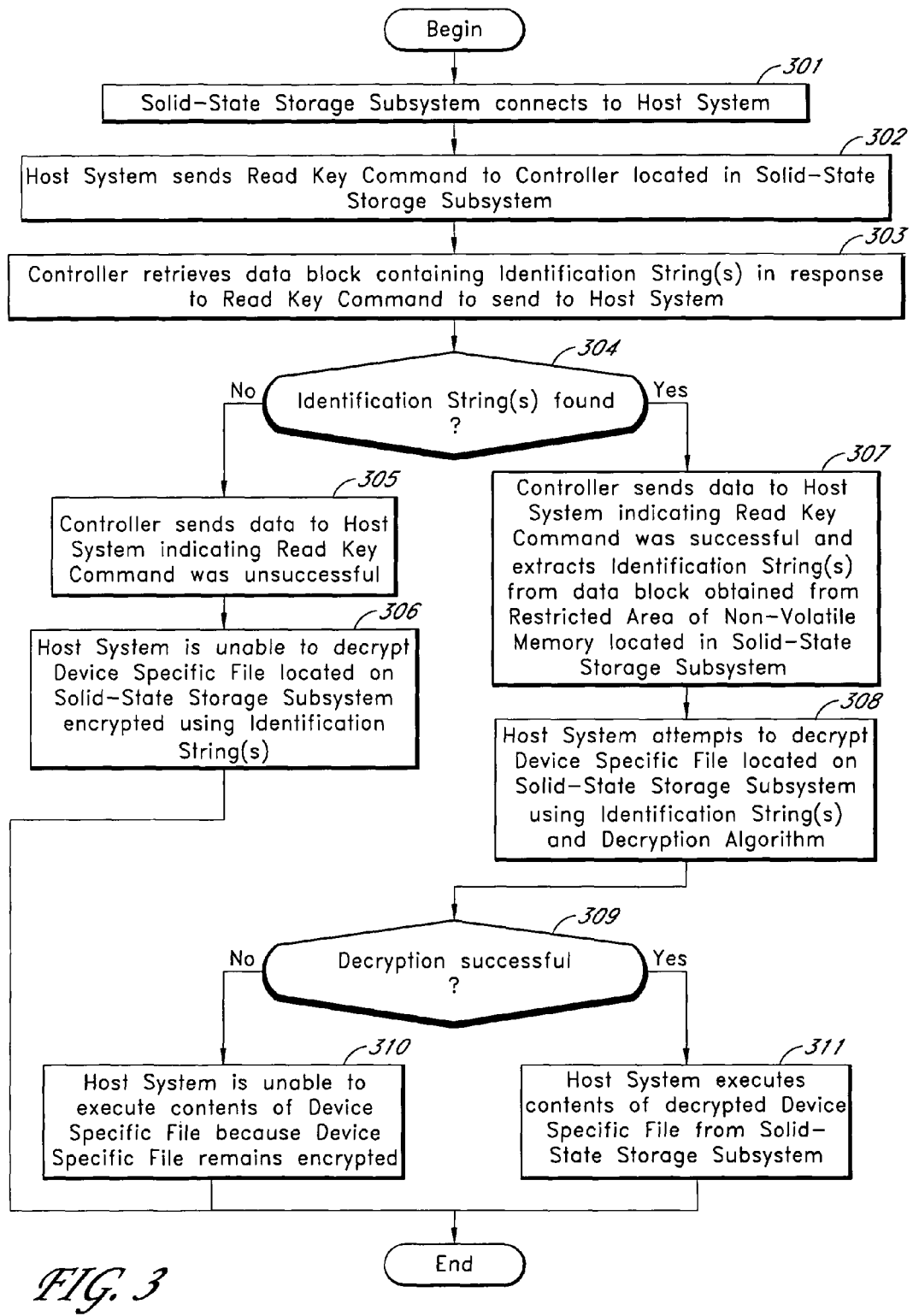
FIG. 3 illustrates a sample process for protecting access to software when a solid-state storage subsystem is engaged with a host system.

FIG. 3 illustrates a sample process for protecting access to software or other information when a subsystem 112 is engaged with a host system 110. In certain embodiments, the host system 110 may be configured to decrypt data from certain solid-state storage subsystems 112 with a certain string 130, as shown in FIG. 1. For example, a vendor may release a new version of software and may distribute the updated software on a subsystem 112 with an identical string 130 as a previous subsystem 112 sent to the owner of the host system 110. Furthermore, the vendor may want to restrict unauthorized access to the software when there is a significant likelihood that software on the subsystem 112 may not be used with the appropriate host system 110.

In step 301, the subsystem 112 is connected to the host system 110. The host system 110 then sends a read key command 500 to subsystem 112 in step 302. In response to the read key command 500, in step 303 the subsystem's controller 114 retrieves a data block containing identification string(s) 130 from the subsystem's 112 restricted memory area 119. According to step 304, if the appropriate data block is not found, the controller 114 informs the host system 110 that the command was unsuccessful (step 305) and consequently the host system 110 is unable to decrypt the device specific file 140 located on the solid-state storage system 112 that was encrypted using the string 130. On the other hand, if the appropriate data block is found, in step 307 the controller informs the host system 110 that the command 500 was successful and extracts the identification string(s) from the data block and returns them to the host system 110. In step 308, the host system then attempts to decrypt the device specific file 140 on the solid-state storage system 112 using the retrieved identification string, or a key generated therefrom. In embodiments where encryption is not used, the host system 110 may simply check to confirm the existence of the appropriate string or strings on the subsystem 112, and refuse subsequent access to the subsystem if the appropriate string data is not found.

In step 309, if the decryption is unsuccessful, for example because the string(s) retrieved from the solid-state storage system 112 is/are invalid, then the host system 110 will be unable to execute or otherwise use the device specific file 140 because the file 140 remains encrypted. On the other hand, if the decryption is successful, the host system 110 will be able to decrypt and execute (or otherwise use) the device specific file 140. In some embodiments, the host system 110 may only be capable of executing the drive specific file 140 directly from the subsystem, as opposed to first reading the file into an internal host memory.

The above-described methods may be used for a wide range of applications. For example, a voicemail system vendor may originally sell a host system 110 configured according to the processes illustrated in FIGS. 2 and 3 (that only runs software from a subsystem 112 connected to the host system 110) to a customer along with an accompanying subsystem 112 containing a unique string 130 in addition to voicemail software. The host system 110 may be configured by the vendor to only run software from a subsystem 112 containing the unique string 130. When the vendor needs to send an updated version of the software to the customer, the vendor may send a new subsystem 112 containing the same unique string 130 as well as the updated software. The customer may then detach the old subsystem 112 from the host system 110 with the old software and attach the new subsystem 112 with the new software. The host system 110 may first examine if the new subsystem 112 contains the correct string(s) in protected memory; if it does, then it can run the updated software. If the solid-state storage subsystem that is attached contains no string or an incorrect string, then the host system 110 will not run the software on the unauthorized new solid-state storage subsystem.

The processes described above protect software from unauthorized use. For example, a user may create copies of the subsystem 112 onto a different solid-state storage subsystem. The user will not, however, be able to copy the string(s) located in restricted physical memory of the subsystem 112. A host system 110 will still attempt to read the unique string(s) using the read key command 500, but will be unable to do so or will read invalid data from the copied subsystem.

Consequently, the host software will refuse to read the software from the unauthorized solid-state storage subsystem, and/or will be unable to decrypt and execute such software. The vendor will thus protect itself from the use of unauthorized copies of its software.

Another feature of certain embodiments is that the vendor can ensure that only subsystems approved by the vendor are used with the host systems 110 provided. For example, in the embodiment shown in FIG. 1, the subsystem 112 contains two data strings 130, 132, where the first data string 130 identifies the brand of the subsystem 112 and the second data string 132 uniquely identifies the subsystem 112 itself. This embodiment enables a host system 110 to identify that a certain brand of subsystem 112 is attached to the host 110, thereby allowing the host system provider, such as a vendor, to control what type of subsystem 112 is used with the vendor's host system 110. This is important for host system 110 providers who wish to ensure that only certain brands of solid-state storage subsystems 112 are used with their host systems 110 as a way to manage their warranty and support costs.

If desired, the host may be configured to work only with a subsystem 112 containing a particular value in the second string 132 (i.e., the string that uniquely identifies the subsystem). To create a one-to-one pairing between a particular host 110 and a particular subsystem 110, the host system 110 may be configured to identify itself to the subsystem via a special command. The subsystem 112 may deny subsequent memory access requests if the host identifier does not match an expected value pre-programmed into the protected memory area of the subsystem 112. In other embodiments, the host system 110 could identify itself to the subsystem 112 when starting up and send a unique identifier to the subsystem 112 which the subsystem 112 would then always looks for upon the host system 110 starting up or whenever the host system attempts to access the subsystem 112. Similarly, the host may deny access to the subsystem, and/or be incapable of decrypting the software or information stored thereon, if the subsystem's unique identifier is invalid. This feature may be used by software providers to ensure not only that certain solid-state storage subsystems 112 are authorized for use with a unique host system 110, but also that only certain host systems 110 are authorized for use with a unique subsystem 112.

The embodiments described herein may advantageously be used with other subsystem 112 security systems. One example security system is a system that protects access to the contents of a flash drive by a password. By advantageously combining the security features of the embodiments disclosed herein with additional password protected security, a vendor may protect its software contents on the subsystem 112 using two levels of protection—string identification and password access. In certain embodiments, before a host system 110 verifies that a subsystem 112 is authorized for use with the host system 110, the subsystem 112 may require a correct password to be entered before the host system 110 can read the contents of, and/or write to, the subsystem 112. This additional level of protection provides for security against unauthorized access to the contents of the subsystem 112, such as to the device specific file, even with the proper host system/solid-state storage subsystem 110/112 combination. For example, if the appropriate host system/solid-state storage subsystem 110/112 combination is stolen, the password protection feature may inhibit the thief from accessing the contents of the subsystem 112.

The embodiments described herein may also be used with a subsystem 112 status monitoring system. One example status monitoring system is discussed in U.S. patent application Ser. No. 11/429,936 filed on May 8, 2006 titled "Systems and Methods For Measuring the Useful Life of Solid-State Storage Devices," the contents of which are hereby incorporated herein by reference in their entirety. By advantageously combining the security features of the embodiments disclosed herein with a utility that monitors the expected life of a subsystem 112, a host system 110 provider will be able to ensure not only that only certain approved subsystems 112 are used with host systems 110, but also that those subsystems have an adequate life remaining. Furthermore, a host system 110 provider can advantageously monitor the expected life of a subsystem 112 according to certain embodiments discussed herein, and when the expected life of the subsystem 112 is nearing completion, the host system 110 provider can send out a new subsystem 112 to the user with an identical string 130, so that the old subsystem 112 may be replaced with the new subsystem 112.

Some additional details of one embodiment of the system will now be described with reference to FIG. 1. The host system 110 may store software on the subsystem 112 and may provide operating system functionality and a boot process for the subsystem 112. The host system 110 includes a computer program represented in computer storage for generating command data that specifies authorization operations, write operations, and read operations as described herein. As discussed below, the read key command 500 verifies authorization to access a specific solid-state storage subsystem 112. The software may comprise, for example, a driver 113 configured to send the command data to the subsystem 112 to cause the storage subsystem 112 to perform the verification operation, the read operation and/or the write operation.

The subsystem or device 112 may comprise, for example, a solid-state memory card that plugs into a slot of the host system 110. In certain embodiments, the memory card complies with, but is not limited to, at least one of the following card specifications: CompactFlash, PCMCIA, SmartMedia, MultiMediaCard, SecureDigital, Memory Stick, ATA/ATAPI, PCI Express, PCI Mezzanine Card, and AdvancedTCA Mezzanine Card. The subsystem 112 may, for example, have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used.

The subsystem 112 comprises a controller 114 and a non-volatile memory ("NVM") or solid-state storage 118. In one embodiment, the controller 114 executes a firmware program to performs processes as described herein and comprises an ATA flash disk controller available, for example, from Silicon Storage Technology, Inc. as part number SST55LD019A. The controller 114 may, however, be implemented using another type of subsystem, such as an application-specific integrated circuit (ASIC) or field-programmable gate array (FPGA) that does not execute firmware. The firmware executed by the controller 114 embodies functionality for implementing the features described herein, including providing access to the restricted memory area 119 via vendor-specific commands.

The solid-state storage 118 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips.

FIG. 4 illustrates one example of how the two strings 130, 132 may be stored in a 512-byte block of memory block 400 that is accessible only via one or more vendor-specific commands. The strings may be provided in any appropriate format, such as a unique universal identifier ("UUID") format. The associated driver software 113 may be encoded with information specifying the locations of these strings in the block, and may thus be able to extract these strings when the associated 512-byte block of data is read. To inhibit reverse engineering or other tampering, the locations of the strings may be varied from one subsystem 112 to the next. Although two strings are used in this embodiment, the identification information used to practice the invention may be stored in protected memory in any appropriate form. The block of protected memory may also be used to store various other types of information associated with other features.

The string or strings 130, 132 may be permanently encoded into the solid-state storage 118 during the manufacturing process of the solid-state memory subsystem 112. Alternatively, the string(s) may be encoded into the solid-state storage 118 after the subsystem 112 is manufactured, such as by using one or more special vendor specific commands.

The host system 110 exchanges control signals with the controller 114 to coordinate the reading and writing of data to and from the solid-state storage subsystem 112. The controller 114 handles the read and write operations by sending memory control signals to the solid-state storage 118. The host 110 may communicate with the subsystem 112 using commands selected from, for example, industry standard command sets such as those provided by ATA, CF card or PC Card standards. The subsystem 112 may, in some implementations, emulate a conventional hard disk drive, such as an ATA disk drive.

FIG. 5 illustrates one example of a command format 500 that may be used for the "read key" command. The read key command is a vendor specific command in the ATA command set and, as such, includes register fields to specify features, sector count, sector number, cylinder low, cylinder high, drive head, and command information. In this example, each register field includes eight bits (i.e., $D_0$-$D_7$) 501. An "X" indicates that the corresponding portion of the register field can have any value. The read key command 500 instructs the controller 114 to read the data block containing the data strings 130, 132 from the protected memory area of the solid-state storage subsystem 112, as described above. In other embodiments, other command numbers that are available in the vendor specific command range, such as in the ATA command set, may be used to implement the read key command.

In other embodiments, the disclosure may be applied to other systems, including mechanical media storage systems such as hard disk drives and hybrid hard drives. For example, the disclosure discussed herein could apply to a hard disk drive with a storage area that was not accessible by an industry standard command set, but that was accessible using a vendor-specific command. Similarly, the disclosure may also apply to a hybrid hard drive, which may have one or more solid-state storage subsystems (such as NAND Flash chips) combined with a traditional hard disk drive in a single form factor.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method for restricting access to data stored in a storage subsystem, the method comprising:
   storing at least one data string including a unique identifier of the storage subsystem in an address location in a restricted area of the storage subsystem, said restricted area accessible to a host system via an ATA vendor-specific memory access command to the storage subsystem and not accessible via a standard ATA memory access command, wherein the address location is selected according to a selection method that varies data string storage location in the restricted area across a plurality of storage subsystems;
   encrypting a data file to create a device-specific file, the encrypting being based at least in part on the at least one data string including the unique identifier of the storage subsystem to inhibit decryption of the device-specific file when it is copied to another storage subsystem; and
   storing the device-specific file on the storage subsystem, the device-specific file being accessible by the host system through a standard ATA memory access command and capable of being decrypted by using the at least one data string.

2. The method of claim 1, wherein the storage subsystem further comprises a magnetic storage medium, and wherein the data is stored on the magnetic storage medium.

3. The method of claim 1, wherein the storage subsystem is comprised of a memory array storing the at least one data string.

4. The method of claim 3, wherein at least two data strings are retrieved in response to the ATA vendor-specific memory access command, and a first of the at least two data strings is permanently written into the memory array.

5. The method of claim 4, wherein the first data string of the at least two data strings identifies the manufacturer of the memory array and a second data string of the at least two data strings identifies the specific memory array from the manufacturer.

6. A solid-state storage subsystem that is adapted to be connected to a host computing subsystem, the solid-state storage subsystem comprising:
   a main memory area having device-specific encrypted information stored therein;
   a restricted memory area that is accessible via a non-standard ATA memory access command and not accessible via a standard ATA memory access command, the restricted memory area containing at least one data string for decrypting the encrypted information, the at least one data string including a unique identifier of the storage subsystem, wherein the at least one data string is stored in an address location in the restrict memory area, the address location being selected according to a selection method that varies data string storage location in the restricted memory area across a plurality of storage subsystems; and
   a controller configured to:
      provide access to the at least one data string in response to a non-standard ATA memory access command received from the host; and
      provide access to the main memory area in response to standard ATA memory access commands,
   wherein the device-specific encrypted information is encrypted based at least in part on the unique identifier of the storage subsystem to inhibit decryption of the device-specific encrypted information when it is copied to another storage subsystem.

7. The solid-state storage subsystem of claim 6, in combination with a host component that is configured to use a non-standard ATA memory access command to retrieve, from the restricted memory area, said information for decrypting the encrypted information, and to use the retrieved information to decrypt the device-specific encrypted information.

8. The solid-state storage subsystem of claim 6, wherein the device-specific encrypted information comprises executable code.

9. The method of claim 1, wherein the encrypting is further based on a password, pass code, serial number, or another unique identifier.

10. The method of claim 1, further comprising the step of writing an encryption pass code to the storage subsystem.

11. The solid-state storage subsystem of claim 6, wherein the non-standard ATA memory access commands comprises an ATA vendor-specific command.

12. A non-transitory computer readable medium which stores executable code that directs a host system to restrict access to data stored by a storage system according to a method that comprises:

storing at least one data string including a unique identifier of the storage subsystem in an address location in a restricted area of the storage subsystem, said restricted area accessible via an ATA vendor-specific memory access command to the storage subsystem and not accessible via a standard ATA memo access command, wherein the address location is selected according to a selection method that varies data string storage location in the restricted area across a plurality of storage subsystems;

encrypting a data file to create a device-specific file, the encrypting being based at least in part on the at least one data string including the unique identifier of the storage subsystem to inhibit decryption of the device-specific file when it is copied to another storage subsystem; and storing the device-specific file on the storage subsystem, the device-specific file being accessible by a host system through a standard ATA memory access command and capable of being decrypted by using the at least one data string.

* * * * *

UNITED STATES PATENT AND TRADEMARK OFFICE
CERTIFICATE OF CORRECTION

| | | |
|---|---|---|
| PATENT NO. | : 8,108,692 B1 | Page 1 of 1 |
| APPLICATION NO. | : 11/475841 | |
| DATED | : January 31, 2012 | |
| INVENTOR(S) | : Merry et al. | |

It is certified that error appears in the above-identified patent and that said Letters Patent is hereby corrected as shown below:

In the Claims

In column 12 at line 6, Claim 12, change "memo" to --memory--.

Signed and Sealed this
Seventh Day of January, 2014

Margaret A. Focarino
*Commissioner for Patents of the United States Patent and Trademark Office*